United States Patent

Liu

[11] Patent Number: 5,913,580
[45] Date of Patent: Jun. 22, 1999

[54] STRUCTURE OF DRAWER TYPE STORAGE BIN

[76] Inventor: Ching-Rong Liu, No. 10, Sung-Chiang N. Road, Chung-Li City, Taiwan

[21] Appl. No.: 08/865,416

[22] Filed: May 30, 1997

[51] Int. Cl.[6] .................................................. A47B 87/00
[52] U.S. Cl. ........................... 312/108; 206/512; 312/263
[58] Field of Search .................................... 312/108, 109, 312/111, 263, 257.1; 206/512, 509

[56] References Cited

U.S. PATENT DOCUMENTS

| | | | |
|---|---|---|---|
| 3,003,839 | 10/1961 | Bloom et al. | 312/111 |
| 4,274,545 | 6/1981 | Peroni | 312/111 |
| 5,399,006 | 3/1995 | Murazumi | 312/109 |
| 5,544,751 | 8/1996 | Klodt et al. | 206/512 |

*Primary Examiner*—Peter M. Cuomo
*Assistant Examiner*—Gerald A. Anderson
*Attorney, Agent, or Firm*—Bacon & Thomas

[57] ABSTRACT

A structure of drawer type storage bin, includes a housing having four vertical rods positioned at the four corners thereof wherein the top end of each rod having a connection member with a tenon internally, a thin plate provided between every two connection members, a lid attached to the housing to form a half sealed cavity having an opening for receiving the drawer and having four slipping over portions positioned correspondently to those of the connection members to connect the latter, an engaging slot provided in each slipping over portion to engage a tenon, four peripheral clamping plates provided to form a clamping area with the peripheral edges of the lid to clamp the thin plates, the lid having at least a limiting plate which has near the said opening a limiting portion for limiting drawing of the drawer out of the housing. The structure is very firm after assembling and thus is practical.

3 Claims, 5 Drawing Sheets

STRUCTURE OF DRAWER TYPE STORAGE BIN

BACKGROUND OF THE INVENTION

1. Field of the Invention

The present invention is related to an improved structure of drawer type storage bin, and especially to the drawer type storage bin which is endued with the characteristic of firm connection and proof of dropping by limitation of being drawn out completely of the drawer, such structure is practical.

2. Description of the Prior Art

Storage bins widely available now in the markets are various, in which the drawer type storage bins are convenient in use, and are widely applicable, hence are quite welcome by customers.

Conventional drawer type storage bins are quite rough structurally, each of them is comprised of a bottom plate and a plurality of vertical rods positioned at the four corners of a bin as well as a lid being assembled to form the hollow housing which can be inserted with a drawer to form a drawer type storage bin.

The inventor of the present invention finds that, there is no specific structural design for connection of the rods and the bottom plate in a conventional drawer type storage bin, only a simple insertion is practised for assembling, this can lower cost of production, however, scattering often is incurred when heavy articles are placed in the bin or when it is transported, customers are quite bothered by such problem.

Moreover, a common drawer type storage bin has its drawer and its bottom plate designed very smooth to get convenient drawing, hence the drawer often is overly pulled out inadvertently and falls down to the ground.

In summary of the above defects, they are all led from rough designs, the inventor of the present invention makes an improvement based on his professional experience of years in manufacturing and designing various storage bins and after hard study and improving, for eliminating disadvantage resided in the drawer type storage bin of the prior art.

SUMMARY OF THE INVENTION

The primary object of the present invention is to provide an improved structure of a drawer type storage bin which is comprised of a housing, a lid and a drawer, wherein, a plurality of vertical rods are positioned at the four corners of the housing, the top end of each vertical rod is provided with a connection member, a thin plate is provided between every two connection members, each connection member is provided internally with a tenon; the lid is attached to the housing to form a half sealed cavity having an opening for receiving a drawer, the lid has a plurality of slipping over portions at the positions thereon corresponding to the above mentioned connection members for connecting to the latter, an engaging slot is provided in each of the slipping over portions for engaging an above mentioned tenon, a plurality of peripheral clamping plates are provided to form a clamping area with the peripheral edges of the lid in order to clamp the above mentioned thin plates. When the lid and the housing are assembled together, the connection members and the slipping over portions firmly engage mutually by means of the tenons and the engaging slots, now the thin plates on the top of the housing which are used to connect with the connection members are engaged exactly in the clamping area formed by the clamping plates and the peripheral edges, so that assembling of the lid and the housing can be firmer.

Another object of the present invention is to provide an improved structure of a drawer type storage bin which is provided at least a limiting plate having a limiting portion near the entry opening for the drawer, when the drawer is drawn out, the rear wall thereof will be stopped by the limiting portion from being completely drawn out of the housing, this can prevent the drawer from falling down on the ground, the present invention thus is practical.

The objects and detailed staructure of the present invention will be apparent after reading the detailed description of the preferred embodiment thereof in reference to the accompanying drawings.

DETAILED DESCRIPTION OF THE PREFERRED EMBODIMENT

Figure 1:
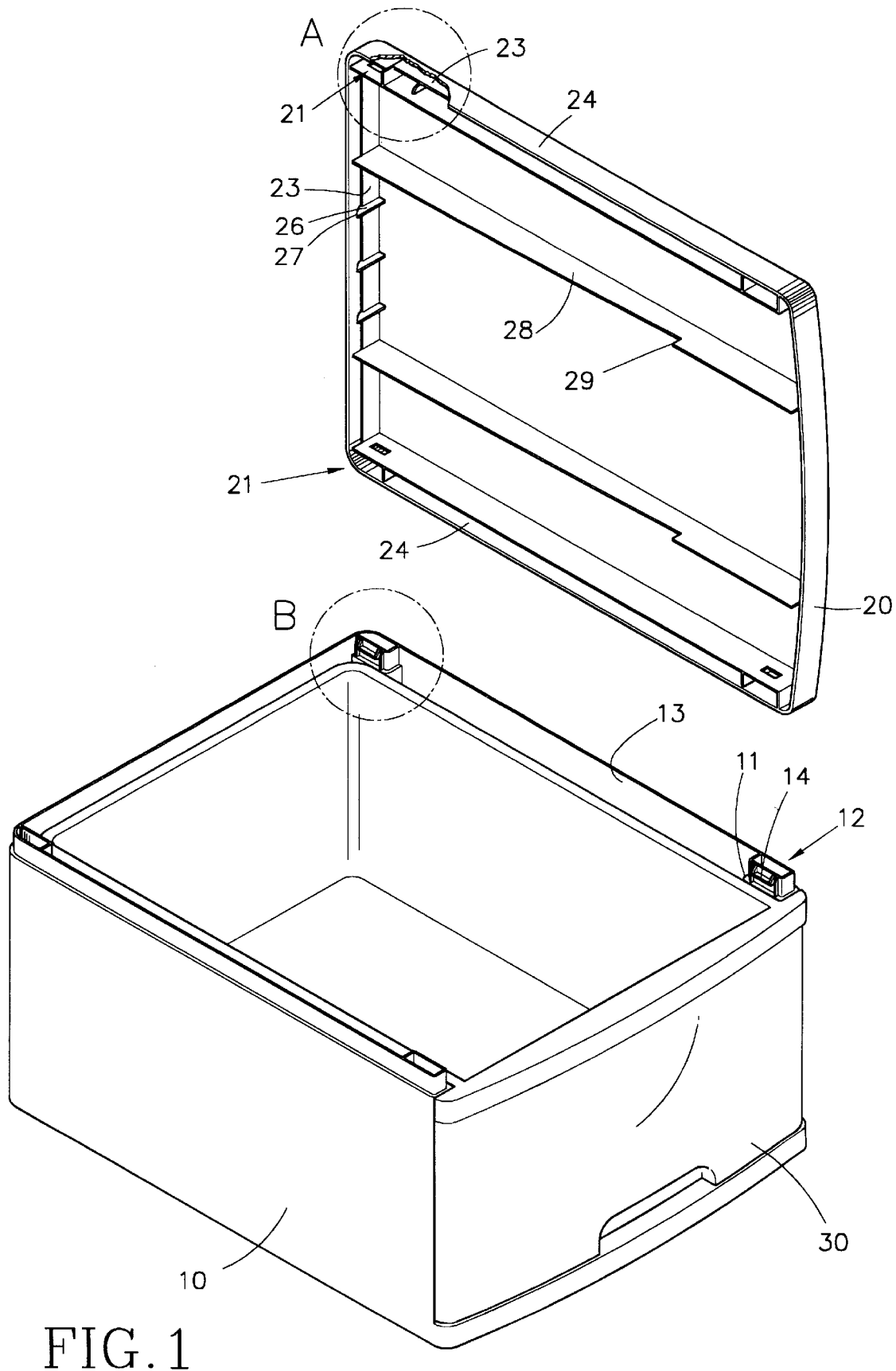
FIG. 1 is an anatomic perspective view of the present invention.
Figure 3:
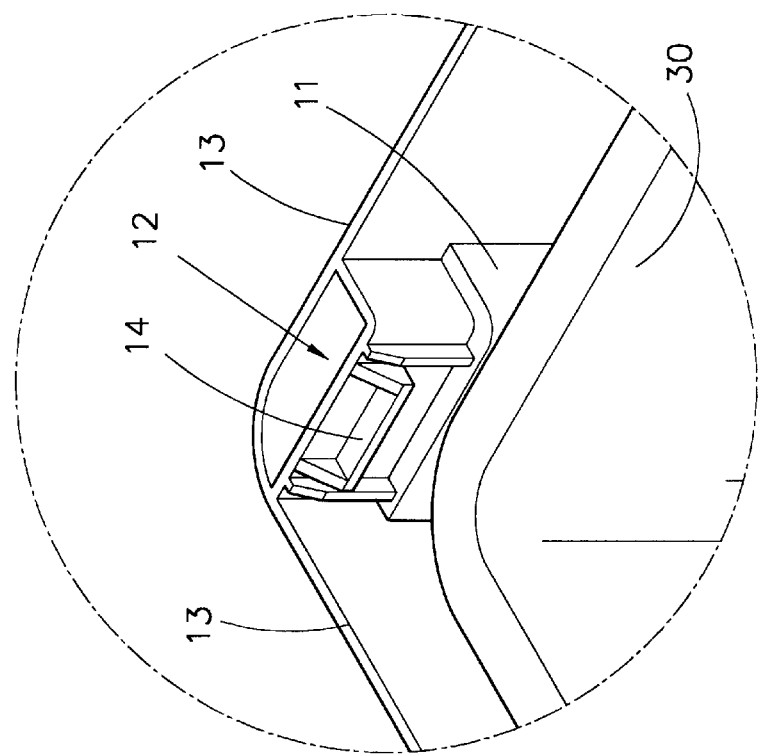
FIG. 3 is an enlarged view of the B part in FIG. 1 of the present invention.
Figure 2:
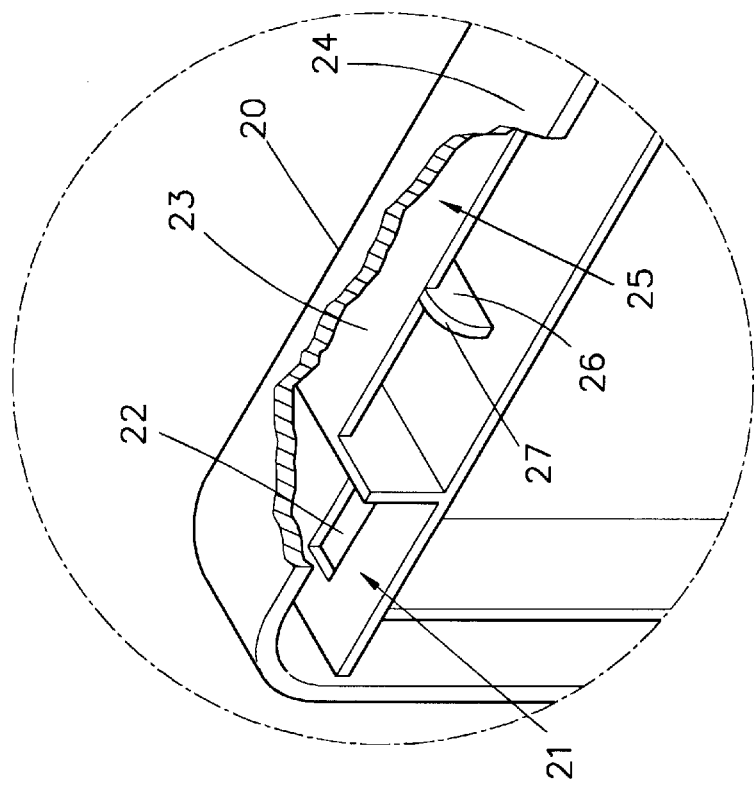
FIG. 2 is an enlarged view of the A part in FIG. 1 of the present invention.

As shown in the drawings attached herein, the improved structure of the drawer type storage bin of the present invention is comprised of a housing 10, a lid 20 and a drawer 30, referring now to FIG. 1, 2 and 3 of the drawings, in which:

The housing 10 has a plurality of vertical rods 11 positioned at the four corners of the housing, the top end of each vertical rod 11 is provided with a connection member 12, a thin plate 13 is provided between every two connection members 12, each connection member 12 is provided internally with a tenon 14.

The lid 20 is attached to the housing to form a half sealed cavity having an opening for receiving a drawer 30, the lid 20 has a plurality of slipping over portions 21 at the positions thereon corresponding to those of the above mentioned connection members 12 for connecting to the latter, an engaging slot 22 is provided in each of the slipping over portions 21 to engage an above mentioned tenon 14, a plurality of peripheral clamping plates 23 are provided to form a clamping area 25 with the peripheral edges 24 of the lid 20 in order to clamp the above mentioned thin plates 13, the exposed walls of the clamping plates 23 is provided with a plurality of ribs 26 on each of which an end is provided with a guiding arciform edge connecting with a clamping plate 23 to strengthen the clamping plates 23 and to guide the thin plates 13 into the clamping area 25; further, at least a limiting plate 28 is provided on the lid 20, the limiting plate 28 is provided near the entry opening for the drawer with a limiting portion 29 which is used for limiting drawing of the drawer out of the housing 10.

Figure 4:
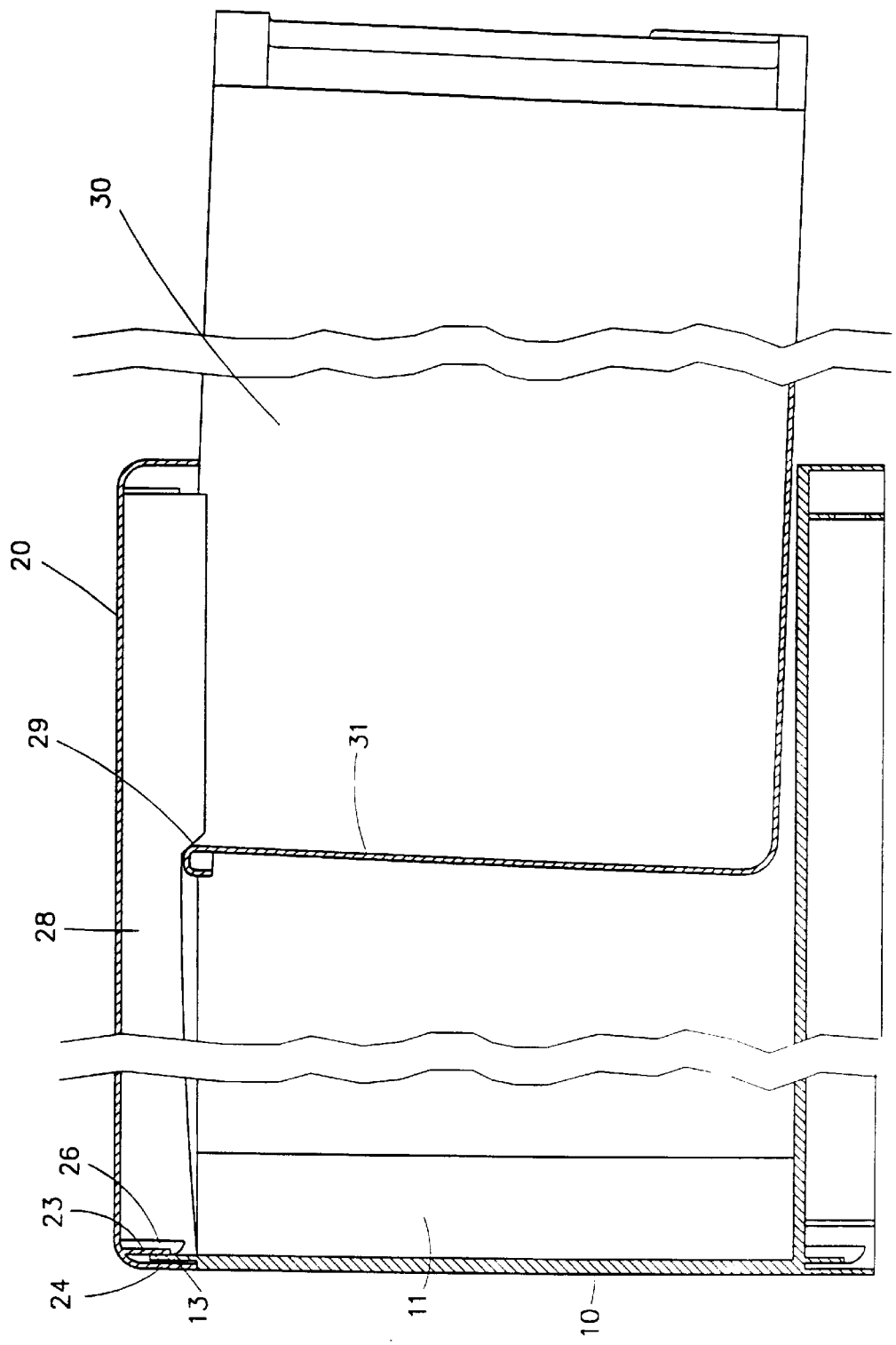
FIG. 4 is a sectional side view of the present invention.
Figure 5:
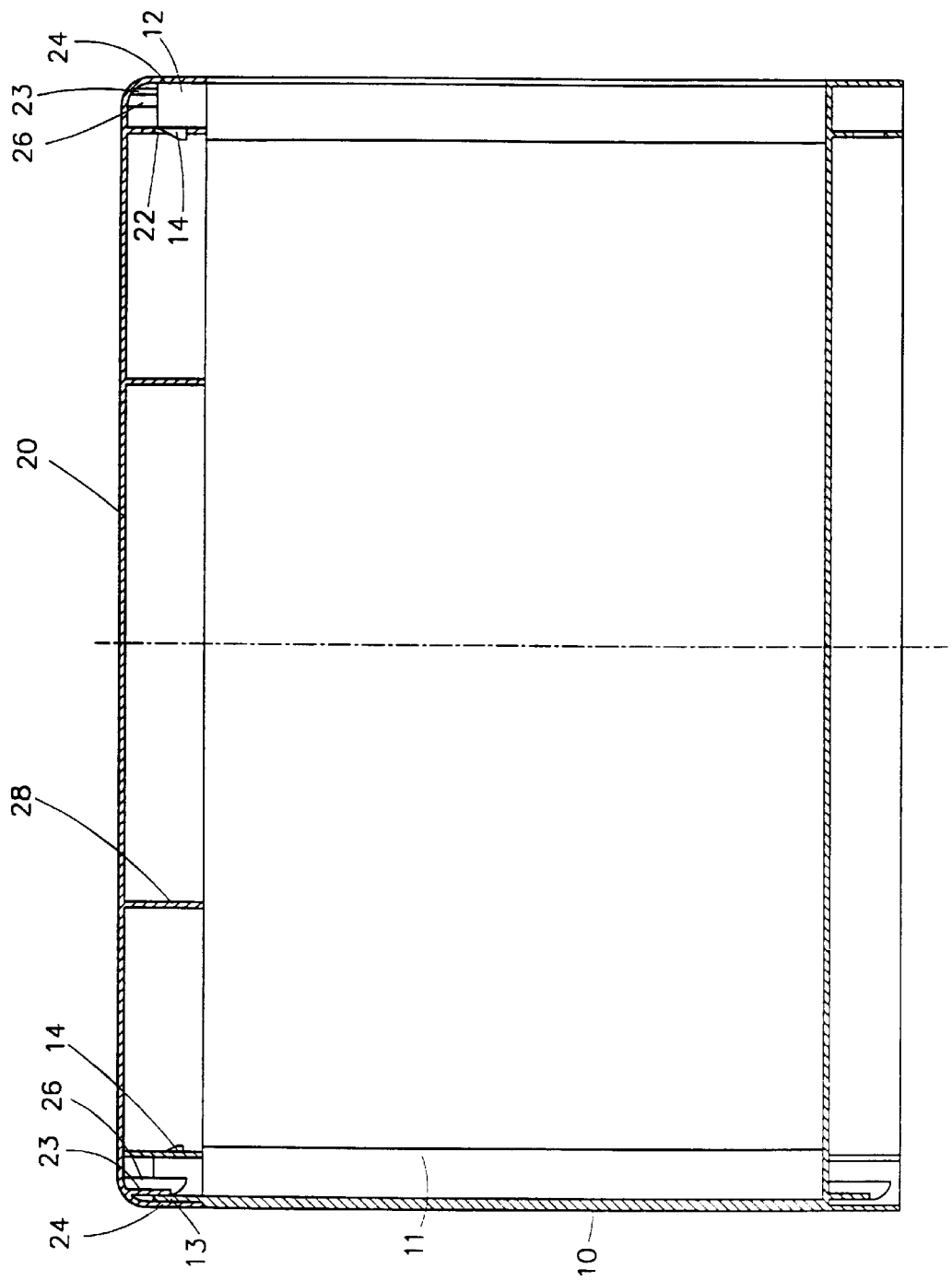
FIG. 5 is a front sectional view of the present invention.

Referring to FIG. 4 and 5, when in assembling, the slipping over portions 21 of the lid 20 are aligned with the connection members 12 of the housing 10, when they are assembled, the tenons 14 on the connection members 12 are exactly inserted into the engaging slots 22 provided in the slipping over portions 21, at this time, the thin plates 13 are inserted into the clamping area 25 and are limited thereby, so that a half sealed cavity having an opening for receiving a drawer is formed.

When the drawer 30 of the present invention is inserted, it will be limited by the limiting portions 29, it can be inserted easily only by a slight inclination, while if it is pulled out, the top end of the rear wall 31 of the drawer 30 will be abutted against the limiting portions 29 (such as is shown in FIG. 4), hence pulling out of the drawer 30 will be hindered, this can prevent the drawer 30 from the trouble of falling down on the ground when it is pulled out by an overly large force.

Figure 6:
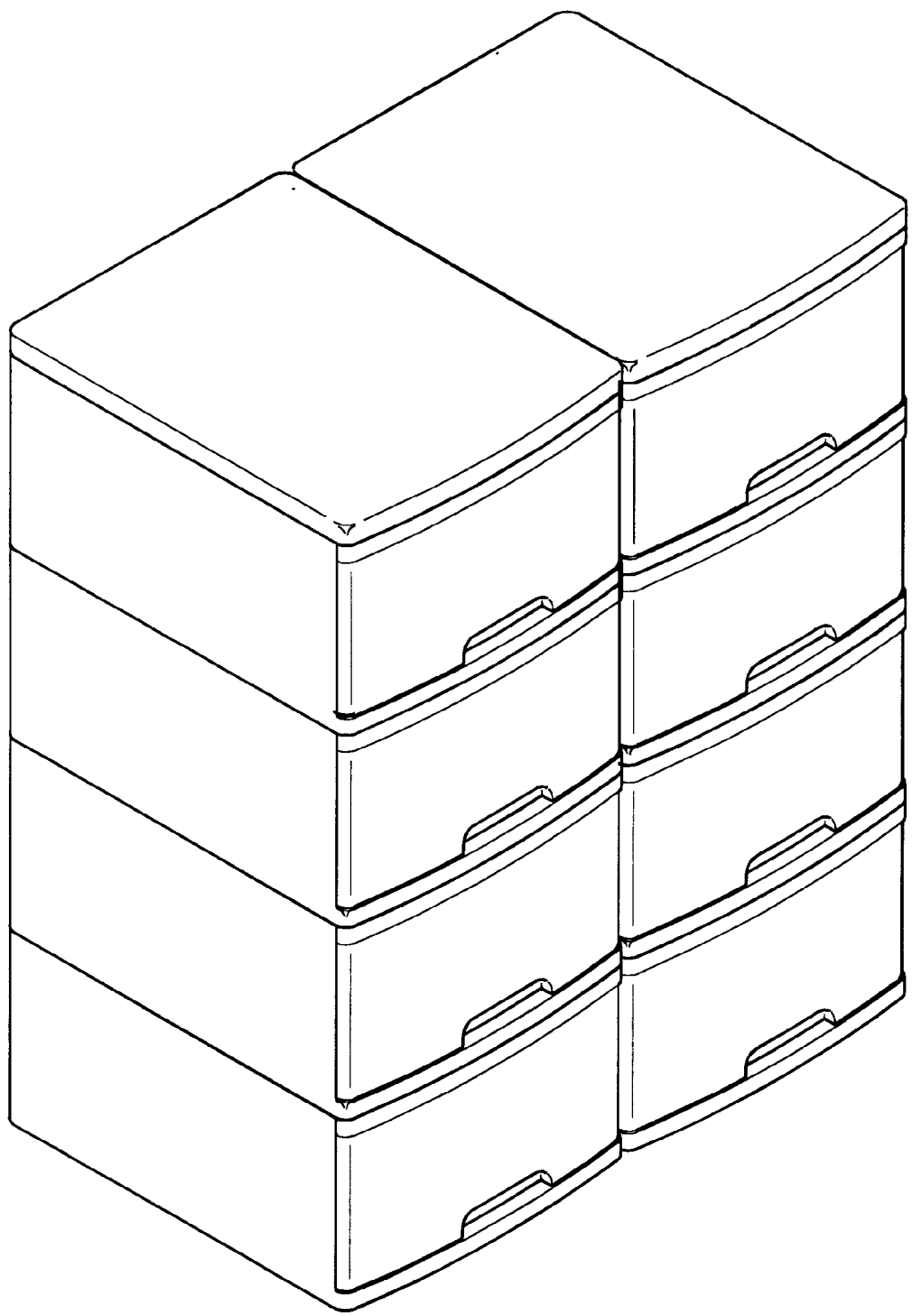
FIG. 6 is a perspective view showing stacking of the present invention.

Referring again to FIG. 5, the bottom of the housing 10 is provided with the same structure as that of the bottom of the lid 20, e.g., the slipping over portions, the engaging slots, the clamping plates, the peripheral edges, the clamping area, the ribs and the guiding arciform edges etc., so that more than two of the above stated housings 10 can be firmly stacked vertically into the state as shown in FIG. 6.

Beside firmness of the whole assembly by combination of the structural designs on the slipping over portions 21, the engaging slots 22, the clamping plates 23, the clamping area 25, the connection members 12 on the housing 10 and the tenons 14, thin plates 13 etc., an additional design of the limiting portions 29 of the limiting plate 28 is provided to limit pulling out of the drawer 30, this can prevent the drawer 30 from the trouble of falling down on the ground.

In conclusion, having thus described the technical structure of my invention with novelty and improveness against the defects resided in the conventional drawer type storage bins, the structure has never existed in the markets, although a preferred embodiment of the present invention has been known and described hereinabove, it is apparent that various changes and modifications might be made without departing from the scope of the invention which is set forth in the accompanying claims. Therefore, what I claim as new and desire to be secured by Letters Patent of the United States are:

I claim:

1. An improved structure of drawer type storage bin, being comprised of a housing, a lid and a drawer, wherein:

said housing has four corners and a plurality of vertical rod positioned at each corner of said housing, a top end of each said vertical rod is provided with a connection member, a thin plate is provided between said connection members, along three peripheral edges of the housing each said connection member is provided internally with a tenon;

said lid is attached to said housing to form a half sealed cavity having an opening for receiving said drawer, said lid has a plurality of slipping over portions at positions corresponding to said connection members, an engaging slot is provided in each of said slipping over portions to engage each said connection member tenon, a plurality of peripheral clamping plates are provided to form a clamping area with peripheral edges of said lid in order to clamp said thin plates, at least a limiting plate is provided on said lid, said limiting plate is provided near a entry opening for said drawer with a limiting portion which is used for limiting drawing of said drawer out of said housing;

when assembled said slipping over portions of said lid engage said connection members of said housing and said tenons on said connection members are inserted into said engaging slots provided in said slipping over portions, said thin plates are inserted into said clamping area so that a half sealed cavity having an opening for receiving said drawer is formed.

2. An improved structure of drawer type storage bin as claimed in claim 1, wherein the exposed walls of said clamping plates is provided with a plurality of ribs on each of which an end is provided with a guiding arciform edge connecting with one of said clamping plates to strengthen said clamping plates and to guide said thin plates into said clamping area.

3. An improved structure of drawer type storage bin as claimed in claim 2, wherein the bottom of said housing is provided with the same structure as that of said lid, including said slipping over portions, said engaging slots, said clamping plates, said peripheral edges, said clamping area, said ribs and said guiding arciform edges, so that more than two of said housings can be firmly stacked vertically.

* * * * *